Jan. 19, 1971     J. R. WYLDE     3,555,630
FASTENER MEMBERS
Original Filed Nov. 15, 1966
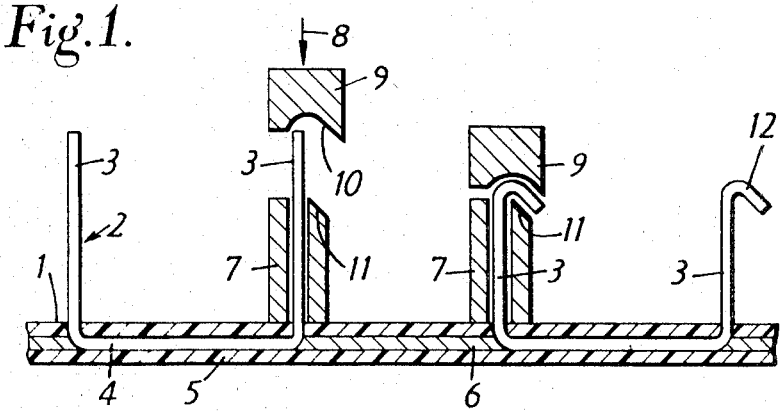
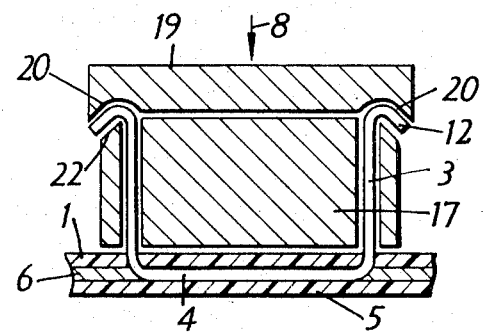
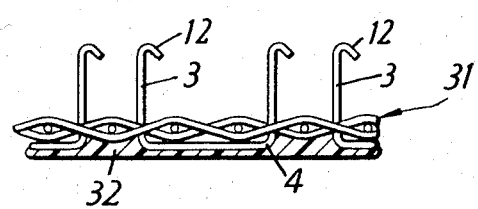
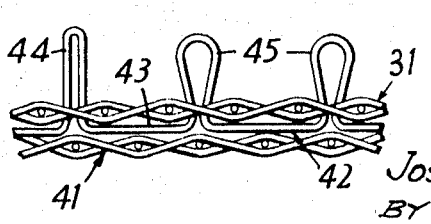
INVENTOR
Joseph Rowland Wylde
BY
Johnson and Kline
ATTORNEYS

3,555,630
FASTENER MEMBERS

Joseph Rowland Wylde, Stoke-on-Trent, England, assignor, by mesne assignments, to Velcro S.A., Nyon, Switzerland, a corporation of Switzerland
Original application Nov. 15, 1966, Ser. No. 594,421. Divided and this application Aug. 13, 1968, Ser. No. 775,213
Int. Cl. A44b 21/00
U.S. Cl. 24—204                        10 Claims

ABSTRACT OF THE DISCLOSURE

A separable fastener of the hook and loop type wherein a series of hook-like members on one surface are adapted to engage a series of loop-like members on another surface, said hook and loop-like members being each formed from a filament passing through a woven member and being subsequently deformed into hook-like or loop-like configuration, the hook-like members when formed resembling staples with deformed free ends.

---

This is a division of application Ser. No. 594,421, filed Nov. 15, 1966.

The invention relates to a fastener member of the type having upstanding elements on a surface shaped to releasably engage with like or cooperating elements on a surface of another fastener member.

The present invention has as its major object the provision of an improved form of such a fastener member and in particular, one suited for use at high temperatures, together with convenient production methods.

The invention accordingly provides a method of producing a fastener member comprising the steps of forming filamentary means with fastener and securement portions at least approximately at right angles and pushing the fastener portions through sheet material so that the fastener portions are upstanding from one surface of the sheet material and the securement portions are in engagement with the other surface of the sheet material. The fastener portions can be preformed as hooks, loops or headed stems or initially generally straight, in the latter case they are subsequently deformed. The invention also provides a fastener member comprising filamentary means having fastener and securement portions at least approximately at right angles, the fastener portion extending through sheet material to upstand from one surface thereof with the securement portion against the other surface, the fastener portion being shaped for releasable engagement with like or cooperating fastener portions of another fastener member. Preferably a backing sheet or layer is secured to the other surface of the sheet material.

The filamentary means can initially comprise short lengths of wire, suitably of hardened spring metal, bent at right angles to provide the securement portion and one or preferably two fastener portions, the elements being then generally L-shaped or U-shaped respectively. The base can be a piece of woven fabric of suitable thickness, in the shape of a strip, for example.

Alternatively, a single length of wire is bent so as to have doubled fastener portions extending at right angles to the main length of the wire at equally spaced points along it. The fastener portions can form loops by bowing the two sides apart. If the fastener element comprises filamentary means of steel and sheet material of woven glass fibre, it can be safely employed at very high temperatures.

The invention will be more readily understood and carried into effect by reference to the following illustrative description and to the accompanying drawings, in which:

FIG. 1 is a sectional side view illustrating phases in the production of a first fastener member in accordance with the invention;

FIG. 2 is a like view illustrating a phase of an alternative production method; and FIGS. 3 and 4 are like views of other fastener members embodying and produced in accordance with the invention.

Referring to FIG. 1, the fastener member illustrated therein comprises a strip of plastics sheet material 1 and a large number of filamentary fastener means each in the form of generally U-shaped staple 2 of metallic wire. In a phase of manufacture previous to that illustrated, the limbs 3 of the staples 2 have been pushed through the strip 1 to project generally at right angles from one side thereof, the base 4 of the U-shaped staple being brought into engagement with the other side of the strip. A further strip 5 of plastics material was then secured to the strip 1 by means of an adhesive 6 with the bases 4 between the strips.

The next phase of manufacture effects deformation of the straight upstanding limbs 3, as shown on the left of FIG. 1, so that these are capable of releasable engagement with like or co-operating elements on another fastener member. Accordingly, the limbs 3 are received in a slot in an anvil 7 which is moved in a direction parallel to the surface of the strip 1 to the position on either side of the limb shown in respect to the second limb 3 from the left of FIG. 1. The strip 5 of course rests on a suitable support (not shown). It will be appreciated that the limbs 3 are not in practice treated individually and that the anvil will accommodate a plurality of them, for example, a row of the limbs aligned across the strip. The free end of the limb 3 projects above the anvil and is acted on by a downward movement, in the direction of the arrow 8, of a former 9 provided with a generally cup shaped recess 10. The recess is shaped to bend the end of the limb downwardly onto a tapered side 11 of the anvil as shown in respect of the second limb from right of FIG. 1. Finally, the former 9 is raised and the anvil 7 withdrawn leaving the limb 3 with a generally hooked free end 12, as shown at the right of FIG. 1, which is capable of engagement with a like hooked element or with loop-shaped element.

FIG. 2 illustrates an alternative form of tool for producing hook-like fastener elements. The basic element is the same as shown in FIG. 1 and like parts have the same reference numerals. An anvil 17 is however employed which provides a pair of slots for receiving an adjacent pair of the limbs 3. A former 19 with deforming recesses 20 co-operates with sloping sides 21 of the anvil to produce, in a single operation hook-shaped ends 12 on both the limbs or rows of limbs 3. The ends 12 face in opposed directions but are no less effective with a suitable co-operating fastener member. The invention can of course employ any suitable deforming tool to obtain the fastener portion shapes required.

The fastener member of FIG. 3 resembles that of FIGS. 1 and 2 in having generally U-shaped filamentary fastener elements which are accordingly given the same reference numerals as have been used before. The limbs 3 however project through sheet material 31 which is a woven fabric. The base 4 of each U-shaped element is moreover secured by a layer 32 of plastics material in which it is embedded. The layer 32 at least partially impregnates the fabric layer, inasfar as the porosity of the fabric permits. The production of this form of fastener member resembles that previously described. The backing layer 32 is of course applied by spreading the plastics material over the appropriate surface of the fabric layer 31 in an uncured, liquid state and allowing it to harden. The plastics material can be selected to have a desired degree of flexibility when cured if this is required. The backing layer can be applied before or after the deformation of the limbs 3 to provide the hooked ends 12 which can be carried out as described above or in any other suitable way.

The fastener member of FIG. 4 resembles that of FIG. 3 in having an upper layer 31 which is woven but has a woven backing layer 41 also. The two layers 31 and 41 are secured together, as by stitching or adhesive. The filamentary fastening means 42 initially comprises a length of wire formed into a plurality of aligned base or securement portions 43, each pair of lengths or legs 44 being connected at their free ends to form fastener portions extending at right angles away from the base portions. As shown the leg lengths 44 are initially disposed in substantially parallel and closed spaced relationship with respect to each other. It is in this form that these lengths are urged against the fabric layer 31 so that the lengths 44 penetrate through the sheet material. Subsequently, the connected lengths 44 are deformed such that the lengths 44 diverge away from each other in a direction away from the surface of the upper layer 31 to thereby form loops 45. This deformation is accomplished by applying pressure to the connected end portions of lengths 44 in a direction perpendicular to the plane of the fabric layers. Any suitable tool, on the lines of the tools described with reference to FIGS. 1 and 2 can be employed to effect this deformation; alternatively, the lengths 44 can be formed into hooks.

It will be evident that the fastener members described and the methods of producing them can be widely varied within the scope of the invention which is not limited to the particular forms of filamentary means, sheet materials, and backing layers described. Where the nature of the sheet material allows, for example, where this is a relatively loosely woven fabric, the fastener portions can be preformed, that is, pushed through in their final shapes. Formation of the fastener portions need not be mechanical; upstanding stems of thermoplastics material can be formed in ball shaped or other enlargements by the action of heat alone.

Fastener portions of different shape can be combined on a single fastener member, and two members can be provided with interengaging fastener elements in a pattern such that elements of one kind can engage elements of another kind on the other fastener, and vice versa. Fastener members according to the invention can be used together for other fastener members, for example, fabric as claimed in British Pat. 721,338 or uncut pile fabric treated by the machine claimed in British Pat. 935,228.

What is claimed is:

1. A separable fastener member comprising:
   (a) a sheet material member;
   (b) a plurality of filament-like fastening elements upstanding from one surface of the sheet material, each fastening element having:
      (1) a base portion disposed in parallel engaging relationship with the other surface of the sheet material opposite said one surface; and
      (2) a leg portion disposed at each end of the base portion in substantially perpendicular relationship thereto, each leg extending through said sheet material with the free end of each leg being deformed into a shape suitable for releasable engagement with another member having a material engaging surface.

2. A separable fastening member according to claim 1 wherein the free end of each leg has a hook-like shape.

3. A separable fastener member according to claim 1 wherein the sheet material comprises a woven fabric.

4. The separable fastening member according to claim 3 including a plastic backing layer secured to said other surface of the sheet material with the base portion of each fastening element being imbedded in the plastic backing layer and with the woven sheet material being at least partially impregnated with the plastic backing layer.

5. A separable fastener member according to claim 1 wherein the sheet material is comprised of plastic material.

6. A separable fastener member according to claim 1 including a backing layer secured to said other surface in overlying relationship to said base portions of said fastening elements.

7. The separable fastening member according to claim 1 wherein the free end of each leg portion is connected to the free end of one of the leg portions of an adjacent fastening element, said connected leg portions being deformed such that the connected leg portions diverge away from each other in a direction away from said one surface of the sheet material to form loops upstanding from said one surface of the sheet material suitable for releasable engagement with another member having a material engaging surface.

8. The separable fastening member according to claim 7 wherein the sheet material comprises a woven fabric.

9. The separable fastening member according to claim 8 including a backing layer secured to said other surface of the sheet material in overlying relationship to the base portions of the fastening elements.

10. The separable fastening member according to claim 9 wherein the backing layer comprises a woven fabric.

References Cited

UNITED STATES PATENTS

| | | | |
|---|---|---|---|
| 2,671,494 | 3/1954 | Coulliette | 24—204UX |
| 2,717,437 | 9/1955 | De Mestral | 24—201VX |
| 2,977,266 | 3/1961 | Sedgley | 161—62X |
| 3,130,111 | 4/1964 | Izumi | 24—204X |
| 3,365,757 | 1/1968 | Billarant | 24—204 |

FOREIGN PATENTS

| | | | |
|---|---|---|---|
| 1,214,649 | 11/1959 | France | 24—204 |
| 589,380 | 3/1959 | Italy | 24—204 |

DONALD A. GRIFFIN, Primary Examiner